United States Patent [19]

Miyajima

[11] Patent Number: 5,116,699
[45] Date of Patent: May 26, 1992

[54] BATTERY BOX

[75] Inventor: Kazuhiko Miyajima, Furukawa, Japan

[73] Assignee: Alps Electric Co., Ltd., Tokyo, Japan

[21] Appl. No.: 596,799

[22] Filed: Oct. 12, 1990

[30] Foreign Application Priority Data

Nov. 11, 1989 [JP] Japan .............................. 1-131582[U]

[51] Int. Cl.$^5$ .............................................. H01M 2/20
[52] U.S. Cl. ...................................... 429/100; 267/160
[58] Field of Search ................. 429/96, 100; 267/158, 267/160

[56] References Cited

U.S. PATENT DOCUMENTS

| | | | |
|---|---|---|---|
| 1,439,429 | 12/1922 | Lynhe .............................. | 429/100 X |
| 2,478,887 | 8/1949 | Nelson .............................. | 429/100 X |
| 3,880,321 | 4/1975 | Braginetz ........................ | 267/160 X |
| 4,414,298 | 11/1983 | Kronz .............................. | 429/100 X |

FOREIGN PATENT DOCUMENTS 61-113371B 7/1986 Japan .

*Primary Examiner*—Stephen Kalafut
*Attorney, Agent, or Firm*—Guy W. Shoup; David W. Heid; B. Noël Kivlin

[57] ABSTRACT

A battery box of high reliability wherein a leaf spring terminal does not readily suffer from settling even if external forces such as vibrations or impacts are applied. The battery box comprises a leaf spring terminal secured to an inner wall of a battery accommodating case for contacting with an electrode of a battery received in the cavity of the battery accommodating case. The leaf spring terminal has a resilient supporting portion having a substantially U-shape and is secured at the opposite end portions thereof to the inner wall of the battery accommodating case. The leaf spring terminal further has a resilient tongue which is folded over itself and a base portion which extends from the bottom of the U-shape of the resilient supporting portion in the same plane as and in parallel to the opposite sides of the U-shape of the resilient supporting portion with a pair of slits left therebetween. The inner wall of the battery accommodating case has a recess formed at a portion opposite to the base portion of the resilient tongue of the leaf spring terminal to allow the base portion of the resilient tongue to be deflected therein.

4 Claims, 3 Drawing Sheets

BATTERY BOX

BACKGROUND OF THE INVENTION

1. Field of the Invention

This invention relates to a battery box wherein a battery is resiliently contacted with a leaf spring terminal secured to a battery accommodating case.

2. Description of the Prior Art

Battery boxes are already known wherein a battery is resiliently contacted with a leaf spring terminal secured to a battery accommodating case. An example of a conventional battery box of the type mentioned is shown in a partial sectional view of FIG. 3. Referring to FIG. 3, a cavity 2 for removably receiving a battery is formed in a battery accommodating case 1 which is, in one embodiment (for example), made of a synthetic resin material. A leaf spring terminal 3 is secured to the battery accommodating case 1 by having a base portion 3a embedded in one of inner walls of the battery accommodating case 1 at one end of the cavity 2. The leaf spring terminal 3 further has a contact portion 3b for contact with a battery (not shown) accommodated in the cavity 2. The contact portion 3b of the leaf spring terminal 3 is connected to the base portion 3a by way of a folded portion 3c such that the contact portion 3b extends in an opposing relationship to the base portion 3a. Suitable resiliency is provided to the contact portion 3b by a fulcrum formed by the folded portion 3c.

When a battery 10 is received in position into cavity 2 as shown in FIG. 4, the contact portion 3b of the leaf spring terminal 3 is resiliently contacted with an electrode 11 of the battery 10. The resilient force provided by the folded portion 3c of the leaf spring terminal 3 establishes electric connection between the leaf spring terminal 3 and the electrode 11 of the battery 10.

However, with such a battery box, if one loads or unloads a battery repeatedly or otherwise vibrates the battery accommodating case, then stress is concentrated upon the folded portion 3c of the leaf spring terminal 3. This concentration may cause a settling of the contact portion 3b which may deteriorate the resiliency of that member. Consequently, the contact pressure of the leaf spring terminal 3 upon the electrode 11 of the battery 10 may be lessened, thereby causing incomplete contact between the leaf spring terminal 3 and the battery.

Japanese Utility Model Publication No. 62-37330, as shown in FIG. 5, discloses another battery box. Referring to FIG. 5, the battery box is substantially similar to the conventional battery box shown in FIG. 3, but differs in that a tapered recess 1a is provided in the inner wall of battery accommodating case 1 opposite the intermediate portion 3d of the leaf spring terminal 3 between the base portion 3a and the folded portion 3c. Tapered recess 1a provides resiliency to the intermediate portion 3d, thereby lessening stress concentration upon the folded portion 3c. Consequently, the leaf spring terminal 3 in FIG. 5 suffers less from settling than that of the battery box shown in FIG. 3.

However, even with the battery box shown in FIG. 5, continuous vibrations or strong shocks may cause settling at the contact portion 3b or at the intermediate portion 3d. Hence, external forces may still cause incomplete contact between the leaf spring terminal 3 and the battery.

SUMMARY OF THE INVENTION

It is an object of the present invention to provide a battery box of high reliability wherein a leaf spring terminal does not readily suffer from settling even if external forces such as vibrations or impacts are applied.

In order to attain the object described above, there is provided a battery box which comprises a battery accommodating case having a cavity defined for removably receiving a battery and a leaf spring terminal secured to an inner wall of the battery accommodating case for contacting with an electrode of a battery received in the cavity of the battery accommodating case. The leaf spring terminal has a resilient supporting portion having a substantially U-shape. The leaf spring terminal is secured at the opposite end portions of the U-shape of the resilient supporting portion to the inner wall of the battery accommodating case.

The leaf spring terminal also has a resilient tongue which is folded over itself. This tongue has a base portion which extends in the form of a cantilever from the bottom of the U-shape of the resilient supporting portion in the same plane as and in parallel to the opposite sides of the resilient supporting portion with a pair of slits left therebetween.

The inner wall of the battery accommodating case has a recess formed at a portion opposite to the base portion of the resilient tongue of the leaf spring terminal. This recess allows the base portion of the resilient tongue to be deflected. The base portion of the resilient tongue extends to the folded portion where the resilient tongue is folded over itself.

The opposite end portions of the U-shape of the resilient supporting portion of the leaf spring terminal may be secured to the inner wall of the battery accommodating case by caulking or else may by inserted the end portions in a pair of slits formed in the wall of the battery accommodating case.

With this construction, if the resilient tongue is pushed, the base portion of the leaf spring terminal is deflected into the recess in the inner wall of the battery accommodating case. As a result of this deflection, the resilient supporting portion is partially, resiliently deflected away from the inner wall of the battery accommodating case. Consequently, the stress is dispersed among the various portions of the leaf spring terminal due to the resiliency at those portions.

Accordingly, settling does not readily occur at any portion of the leaf spring terminal. Hence, there is little possibility that incomplete contact between the leaf spring terminal and a battery will be caused by external forces. The result is a battery box high in reliability.

The above and other objects, features, and advantages of the present invention will become apparent from the following description, the appended claims, and the accompanying drawings.

DETAILED DESCRIPTION OF THE PREFERRED EMBODIMENT

Figure 1:
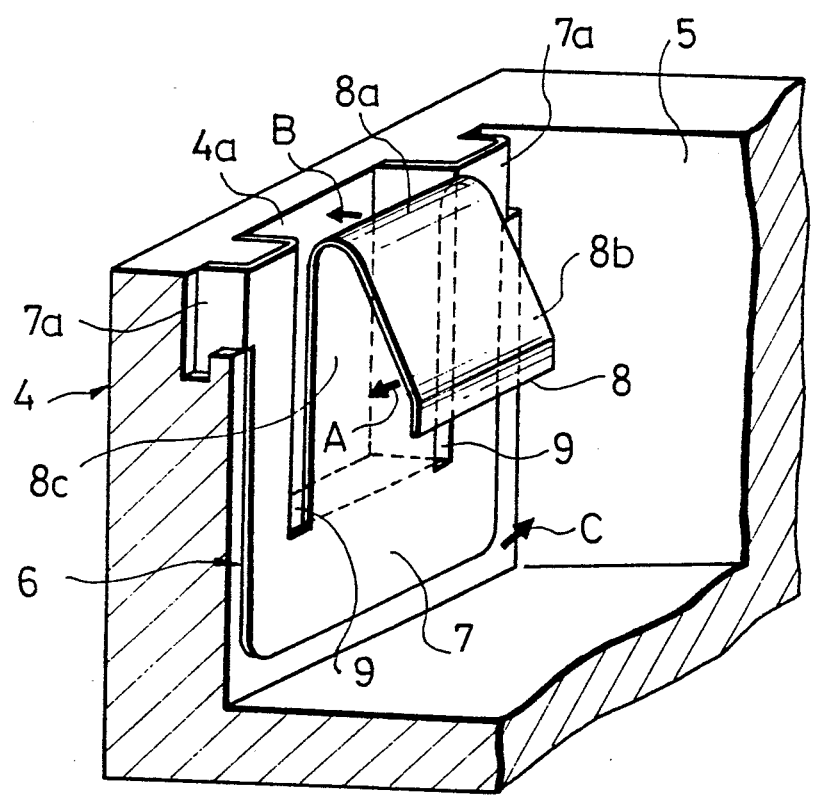
FIG. 1 is a perspective sectional view of part of a battery box which embodies the present invention.

Referring first to FIG. 1, a battery box is shown which embodies the present invention. The battery box includes a battery accommodating case 4 made of a suitable synthetic resin material. A cavity 5 for accommodating a battery is defined by the battery accommodating case 4. A leaf spring terminal 6 is mounted on one of inner walls of the cavity 5 at an end of the battery accommodating case 4. The leaf spring terminal 6 has a resilient supporting portion 7 of a substantially U-shape in side elevation as viewed in FIG. 1 and is secured at the opposite end portions 7a of the U-shape thereof to the inner wall of the case 4 by caulking or some other suitable means. The opposite end portions 7a of the resilient supporting portion 7 are electrically connected to lead portions not shown.

A resilient tongue 8 of a folded shape, for example, an inverted U- or J-shape, is supported in the form of a cantilever extending from the inner edge of the bottom side of the U-shape of the resilient supporting portion 7. In particular, the resilient tongue 8 has an intermediate folded portion 8a which folds over itself, a contact portion 8b extending from the folded portion 8a to a free end for resiliently contacting with an electrode of a battery (not shown) accommodated in the cavity 5, and a base or connecting portion 8c connected to the resilient supporting portion 7 and extending to the folded portion 8a. When not deflected, the connecting portion 8c of the resilient tongue 8 is located in the same plane as and in parallel to the opposite sides of the U-shape of the resilient supporting portion 7 with a pair of slits 9 left therebetween. The connecting portion 8c extends such that the folded portion 8a at the end thereof, remote from the bottom side of the U-shape of the resilient supporting member 7, may be substantially level with the ends of 7a.

The inner wall of the battery accommodating case 4 is recessed at a portion 4a which is opposite to the connecting portion 8c of the resilient tongue 8 of the leaf spring terminal 6. This recess allows the connecting portion 8c to be deflected into the recessed portion 4a.

The structure of the leaf spring terminal 6 described above assures a long span over which resilient deformation is permitted. More specifically, resiliency is provided at the resilient supporting portion 7 (except the opposite end portions 7a), the contact portion 8b, and connecting portion 8c. Consequently, repetitive loading and unloading of a battery into and out of the cavity 5 will not cause settling of the leaf spring terminal 6.

When external forces such as vibrations or impacts are applied to case 4, the contact portion 8b of the resilient tongue 8 of the leaf spring terminal 6 is pushed by the battery received in cavity 5. Contact portion 8b is deflected in the direction indicated by an arrow mark A. Additionally, the connecting portion 8c is deflected in the direction indicated by an arrow mark B into the recess 4a of the inner wall of the battery accommodating case 4 while the resilient supporting portion 7 is deflected in the direction indicated by an arrow mark C. Accordingly, the stress is dispersed by the resiliency of the three portions, and consequently, the possibility that the leaf spring terminal 6 will suffer from settling is lessened. In other words, the leaf spring terminal 6 does not readily undergo plastic deformation because the span over which resilient deformation is permitted is long. As a result, even if vibrations or strong shocks are applied to the leaf spring terminal 6 for a long period of time, the leaf spring terminal 6 can maintain a required contact pressure to an electrode of a battery. Accordingly, the battery box is high in reliability.

Figure 2:
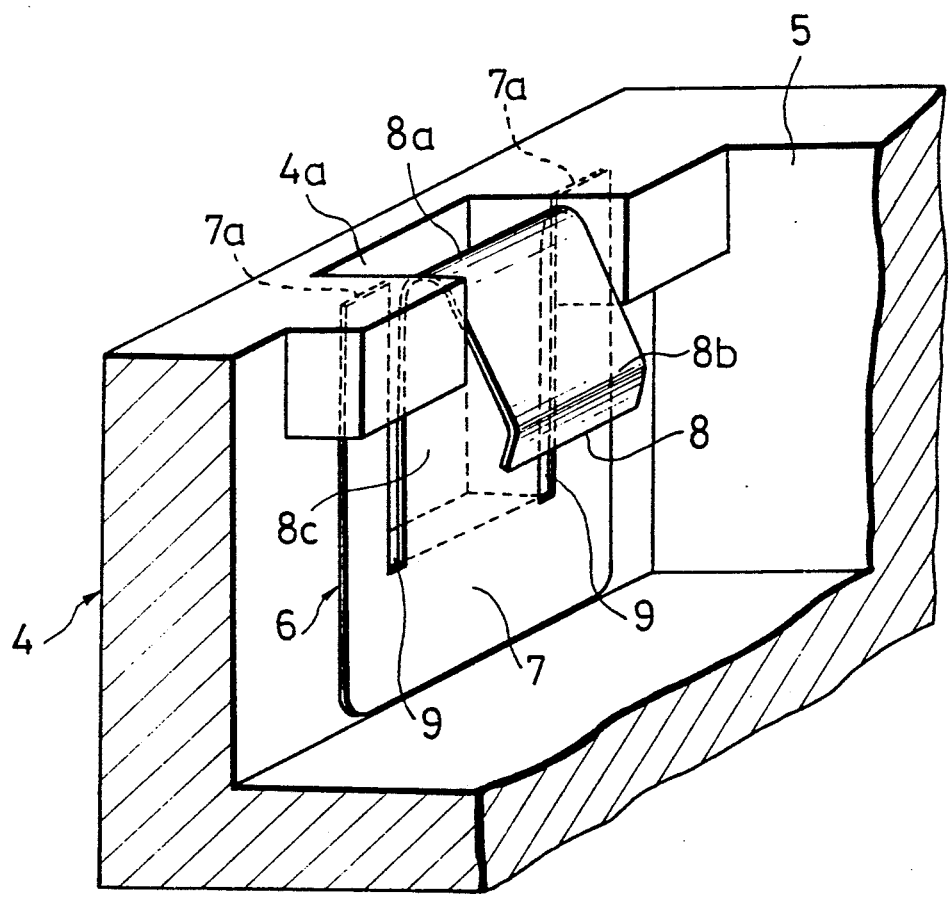
FIG. 2 is a similar view but showing a modified battery box.
Figure 3:
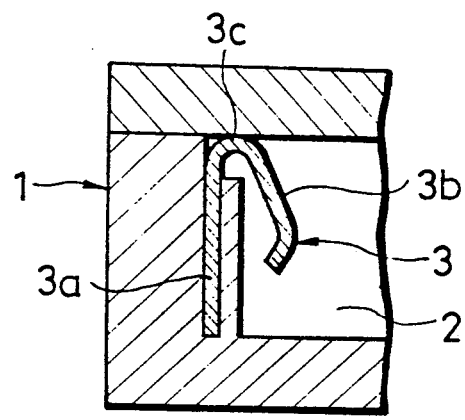
FIG. 3 is a sectional view of part of a conventional battery box found in the prior art.
Figure 4:
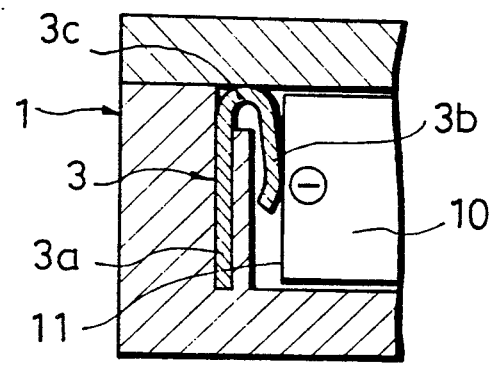
FIG. 4 is a similar view showing the battery box of FIG. 3 when a battery is inserted.
Figure 5:
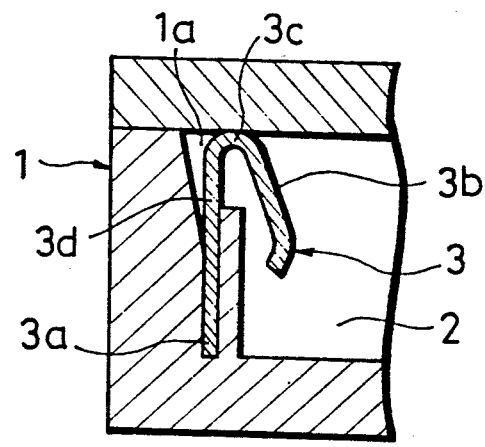
FIG. 5 is a similar view of part of another conventional battery box.

FIG. 2 shows a modification to the battery box described in FIG. 1. The modified battery box has a different mounting structure for the leaf spring terminal 6. In particular, the opposite end portions 7a of the U-shape of the resilient supporting portion 7 of the leaf spring terminal 6 are inserted in a pair of recesses (not shown) formed in the inner wall of the battery accommodating case 4 to secure the leaf spring terminal 6 of the battery accommodating case 4.

Having now fully described the invention, one of ordinary skill in the art will note that many changes and modifications can be made without departing from the spirit and scope of the invention as set forth.

What is claimed is:

1. A battery box comprising:
   a battery accommodating case having a cavity defined for removably receiving battery therein; and
   a leaf spring terminal secured to an inner wall of said battery accommodating case for contacting with an electrode of a battery received in said cavity of said battery accommodating case, said leaf spring terminal having a resilient supporting portion with an overall, substantially U-shape, wherein said leaf spring terminal is secured at the opposite end portions of the U-shape of said resilient supporting potion thereof to said inner wall of said battery accommodating case;
   said leaf spring terminal further having a resilient tongue which is folded over itself, said resilient tongue having a base portion extending in the form of a cantilever from the bottom of said U-shape of said resilient supporting portion in the same plane as and in parallel to the opposite sides of said resilient supporting portion with a pair of slits left therebetween;
   said inner wall of said battery accommodating case having a recess formed at a portion opposite to said base portion of said resilient tongue of said leaf spring terminal to allow said base portion of said resilient tongue to be deflected therein.

2. A battery box according to claim 1, wherein said base portion of said resilient tongue of said leaf spring terminal extends to a folded portion wherein said resilient tongue is folded over itself such that said folded portion is level with the opposite ends of the U-shape of said resilient supporting portion.

3. A battery box according to claim 1, wherein the opposite end portions of the U-shape of said resilient supporting portion of said leaf spring terminal are secured to said inner wall of said battery accommodating case by caulking.

4. A battery box according to claim 1, wherein the opposite end portions of the U-shape of said resilient supporting portion of said leaf spring terminal are inserted in a pair of slits formed in said wall of said battery accommodating case to secure said leaf spring terminal to said battery accommodating case.

* * * * *